United States Patent
Ma

(10) Patent No.: US 6,565,003 B1
(45) Date of Patent: *May 20, 2003

(54) METHOD FOR LOCATING AND READING A TWO-DIMENSIONAL BARCODE

(75) Inventor: Yue Ma, West Windsor, NJ (US)

(73) Assignee: Matsushita Electric Industrial Co., Ltd. (JP)

( * ) Notice: Subject to any disclaimer, the term of this patent is extended or adjusted under 35 U.S.C. 154(b) by 270 days.

This patent is subject to a terminal disclaimer.

(21) Appl. No.: 09/586,299

(22) Filed: Jun. 2, 2000

Related U.S. Application Data

(63) Continuation-in-part of application No. 09/212,243, filed on Dec. 16, 1998, now Pat. No. 6,082,619.

(51) Int. Cl.⁷ .................................................. G06K 7/10
(52) U.S. Cl. .............................. 235/462.1; 235/462.08; 235/462.11; 382/237
(58) Field of Search ........................ 235/462.08, 462.1, 235/462.11, 437, 438, 456, 460, 494; 382/237, 270, 281, 289

(56) References Cited

U.S. PATENT DOCUMENTS

| | | | |
|---|---|---|---|
| 4,447,903 A | 5/1984 | Sewerinson | |
| 4,692,603 A | 9/1987 | Brass et al. | |
| 4,736,109 A | 4/1988 | Dvorzsak | |

(List continued on next page.)

FOREIGN PATENT DOCUMENTS

| | | |
|---|---|---|
| JP | 62-219768 | 9/1987 |
| JP | 62-219769 | 9/1987 |

OTHER PUBLICATIONS

Smart Paper—Documents That Both People and Computers Understand.
Smart Paper—Smart Paper Toolkit Technical Overview.
Jain et al., Bar Code Localization Using Texture Analysis, *Proceedings of the Second International Conference on Document Analysis and Recognition*, Oct., 1993.
Viard–Gaudin et al., A Bar Code Location Algorithm Using a Two–Dimensional Approach, *Proceedings of the Second International Conference on Document Analysis and Recognition*, Oct., 1993.

*Primary Examiner*—Diane I. Lee
(74) *Attorney, Agent, or Firm*—Amster, Rothstein & Ebenstein

(57) ABSTRACT

Two-dimensional barcodes surrounded by a quiet zone of white space which may or may not include a border, each barcode having encoded digital information in a bitmap representing preferably randomized encoded data bits, are printed onto a printed medium. To extract the encoded digital information from the printed medium, the printed medium is scanned, then the bitmap is located within the printed medium by moving a window, in stepwise fashion in a predetermined pattern across the printed medium. At each step the portion of the printed medium which is encompassed by the window is tested to determine whether it conforms to one or more characteristics of the bitmap. The skew of the bitmap, if any, is determined, by using a finite-state recognizer in combination with a Hough Transform calculation. In one embodiment, the candidate region is divided into a plurality of horizontal regions, preliminary skew angles are calculated for each region, and the actual skew angle is selected using a voting scheme. Once the skew angle is calculated, the bitmap is deskewed if necessary, cropped, and the randomized digital information is read from the bitmap. Finally, the digital information is derandomized and any error correction codes are removed, in the process correcting and/or recording any errors discovered, thereby reproducing the original encoded digital information.

3 Claims, 12 Drawing Sheets

U.S. PATENT DOCUMENTS

| | | |
|---|---|---|
| 4,750,209 A | 6/1988 | Shimura et al. |
| 4,754,127 A | 6/1988 | Brass et al. |
| 4,782,221 A | 11/1988 | Brass et al. |
| 4,924,078 A | 5/1990 | Sant'Anselmo |
| 4,939,354 A | 7/1990 | Priddy et al. |
| 4,948,955 A | 8/1990 | Lee et al. |
| 4,988,852 A | 1/1991 | Krishnan |
| 5,051,779 A | 9/1991 | Hikawa |
| 5,053,609 A | 10/1991 | Priddy et al. |
| 5,060,980 A | 10/1991 | Johnson et al. |
| 5,065,437 A | 11/1991 | Bloomberg |
| 5,073,954 A | 12/1991 | Van Tyne et al. |
| 5,083,214 A | 1/1992 | Knowles |
| 5,091,966 A | 2/1992 | Bloomberg et al. |
| 5,126,542 A | 6/1992 | Priddy et al. |
| 5,128,525 A | 7/1992 | Stearns et al. |
| 5,168,147 A | 12/1992 | Bloomberg |
| 5,189,292 A | 2/1993 | Batterman |
| 5,221,833 A | 6/1993 | Hecht |
| 5,241,166 A | 8/1993 | Chandler |
| 5,245,165 A | 9/1993 | Zhang |
| 5,262,623 A | 11/1993 | Batterman et al. |
| 5,296,690 A | 3/1994 | Chandler et al. |
| 5,304,787 A | 4/1994 | Wang |
| 5,324,923 A | 6/1994 | Cymbalski et al. |
| 5,337,362 A | 8/1994 | Gormish et al. |
| 5,343,031 A | 8/1994 | Yoshida |
| 5,352,878 A | 10/1994 | Smith et al. |
| 5,378,881 A | 1/1995 | Adachi |
| 5,404,003 A | 4/1995 | Smith |
| 5,477,037 A | 12/1995 | Berger |
| 5,487,115 A | 1/1996 | Surka |
| 5,517,587 A | 5/1996 | Baker et al. |
| 5,570,435 A | 10/1996 | Bloomberg et al. |
| D377,501 S | 1/1997 | Pierce |
| 5,616,905 A | 4/1997 | Sugiyama |
| 5,737,442 A | 4/1998 | Alam |
| 5,790,715 A | 8/1998 | Iizuka |
| 5,801,848 A | 9/1998 | Kafri |
| 5,862,260 A | 1/1999 | Rhoads |
| 5,862,270 A | 1/1999 | Lopresti et al. |
| 5,866,895 A | 2/1999 | Fukuda |
| 5,956,422 A | 9/1999 | Alam |
| 5,974,200 A | 10/1999 | Zhou et al. |
| 6,006,993 A | 12/1999 | Dickson et al. |
| 6,014,464 A | 2/2000 | Kurzweil et al. |
| 6,201,901 B1 | 3/2001 | Zhou et al. |

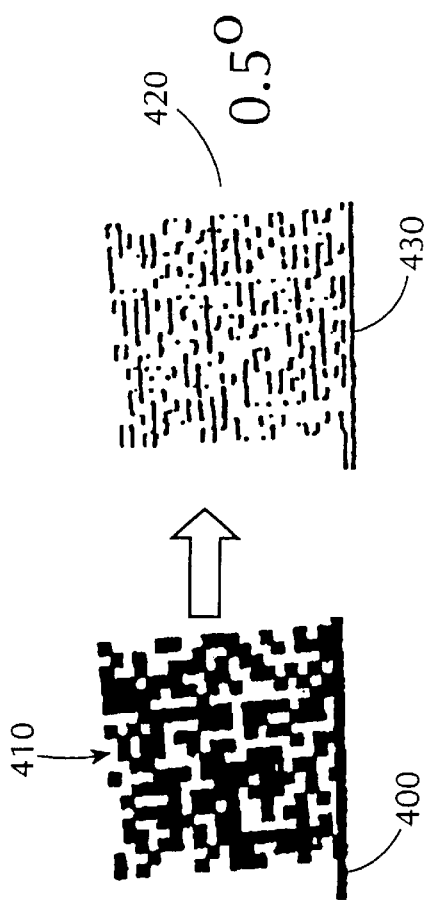
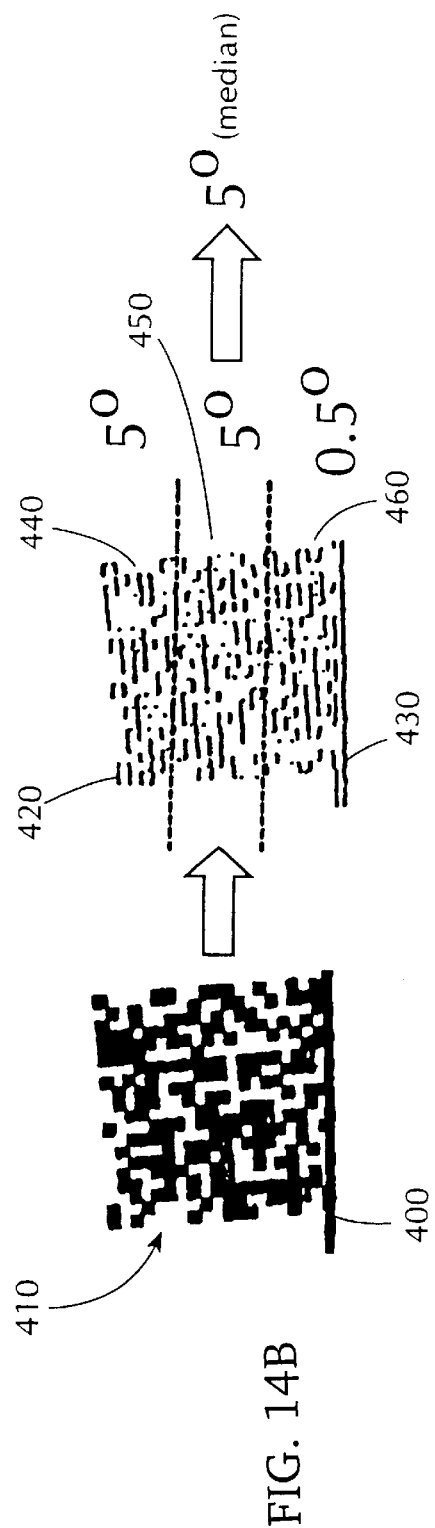
FIG. 14A
FIG. 14B

METHOD FOR LOCATING AND READING A TWO-DIMENSIONAL BARCODE

CROSS-REFERENCES

This application is a continuation-in-part of U.S. patent application Ser. No. 09/212,243, filed Dec. 16, 1998 now U.S. Pat. No. 6,082,619.

FIELD OF THE INVENTION

The invention relates generally to an improved method for locating and reading two-dimensional barcodes printed within an image.

BACKGROUND OF THE INVENTION

Contrary to the frequent predictions that we will one day live in a "paperless society", paper, and other printed mediums, are playing an increasingly important role as an inexpensive, effective and convenient means for communication. A fundamental limitation with paper, however, is that from a computer standpoint, it is currently an output-only format. While paper may be the preferred medium for displaying information for human use, it is difficult, if not impossible, for a computer to recover data reliably once it has been printed. Optical character recognition (OCR) attempts to solve this problem in a relatively simple domain, such as text rendered using standard fonts, but has met with only limited success thus far. While accuracy rates of ninety-nine (99%) percent are perhaps achievable and may seem impressive, a page with 3,000 characters will still incur an average of thirty (30) OCR errors and hence requires expensive and time consuming manual post-processing.

Another approach uses computer readable barcodes which may be included directly on paper (or other printed medium such as microfilm). Once encoded, such barcodes can be used by the computer to recover information evident to the human reader but difficult for a computer to recognize (e.g., printed text), information implicit to the creation of page but essentially invisible to the human reader (e.g., spreadsheet formulas), or any other information desired, whether or not dependent on the actual character text on the paper.

Computer readable barcodes, wherein digital data is recorded directly on paper, are known and have been utilized to provide document or product identification given a fixed set of values using simple numeric encoding and scanning technologies. Document or product identification systems which have been employed in the past include barcode markers and scanners which have found use in a wide range of arenas. With respect to paper documents, special marks or patterns in the paper have been used to provide information to a related piece of equipment, for example the job control sheet for image processing as taught by Hikawa in U.S. Pat. No. 5,051,779. Similarly, identifying marks comprising encoded information have been printed on the face of preprinted forms as described in U.S. Pat. No. 5,060,980 to Johnson, et al. The Johnson, et al. system provides for a user entering hand drawn information in the fields on a paper copy of the form and then scanning the form to provide insertions to the fields in the duplicate form that is stored electronically in the computer. Still another system is described in U.S. Pat. No. 5,091,966 of Bloomberg, et al., which teaches the decoding of glyph shape codes, which codes are digitally encoded data on paper. The identifying codes can be read by a computer and thereby facilitate computer handling of the document, such as identifying, retrieving and transmitting such document.

Besides the various shaped barcodes described above, two-dimensional barcodes called "data strips" having a plurality of rows of "data lines" that represent information digitally encoded on printed media are also known in the art. Each data line row consists of a series of black and white pixels each representing binary "0"s and "1"s. The ordering of the bits in each row determines the digital data stored therein. The data stored within the totality of the rows define the data contained in the two-dimensional barcode. Typically, to read the barcode, the user passes a hand scanner, which simultaneously reads the information in each data line row, vertically along the length of the barcode to read all of the data line rows.

An example of a prior art system using a data strip two-dimensional barcode having rows of data lines with paper media, is found in U.S. Pat. Nos. 4,692,603, 4,754,127 and 4,782,221 of Brass, et al. In this system, two-dimensional barcodes consist of data line rows which are used to encode computer programs and data on paper and are scanned by use of a hand scanner. In addition to encoding the computer programs and data, these data lines also contain tracking and synchronization bits, hereinafter referred to as "clock bits". The requirement for use of numerous clock bits directly within each data line row, significantly reduces the amount of digital data that can be stored within each row. Further, if data line rows having clock bits are damaged, which is common if such barcodes are photocopied or transmitted by facsimile systems, such clock bits would be lost making it difficult, if not impossible, to decode the information encoded in the barcode. Other examples of two-dimensional barcodes include: (1) U.S. Pat. No. 5,083,214 to Knowles, which describes a two-dimensional barcode system that requires clock bits embedded within the encoded data itself; and (2) U.S. Pat. No. 4,924,078 to Sant'Anselmo et al., which describes a two-dimensional barcode system in which an orientation and/or timing cell border is included within the body of the barcode itself.

In addition, in co-pending patent application "A Clock-Free Two-Dimensional Barcode and Method for Printing and Reading the Same", (Ser. No. 08/569,280, filed Dec. 8, 1995) ("the '280 Application"), the contents of which are explicitly incorporated by reference herein, a clock-less two-dimensional barcode with a border on at least one of the four sides of the barcode is described, which border is placed outside the confines of the barcode itself. The two-dimensional barcodes are sometimes called "PanaMarks"®. As depicted in FIG. 1A herein, two-dimensional barcode 10 is printed in the low right hand corner of printed page 11, although this position is completely arbitrary. In the embodiment depicted in FIG. 1A, the remaining portion of printed page 11 is occupied by printed text 12. However, as one skilled in the art will appreciate, any type of computer-generated printed material, for example a spreadsheet or graphics, can be substituted for the printed text 12. The two-dimensional barcode 10 depicted in FIG. 1B herein includes a border 13 that is present on all four of its sides. As is fully described in the '280 Application, although the border 13 is only needed on one of the four sides of the two-dimensional barcode 10, for aesthetic reasons it is typically included on all four sides.

Also, in co-pending patent application "A Borderless Clock-Free Two-Dimensional Barcode and Method for Printing and Reading the Same", (Ser. No. 09/088,189, filed Jun. 1, 1998) ("the '189 Application"), the contents of which are explicitly incorporated by reference herein, a clock-less two-dimensional barcode without a border (shown in FIG. 2 herein) is described, along with methods of printing and reading the same. Two alternate symbologies for the barcode are presented in the '189 Application, a first symbology which requires that the four corner bits 21 to be black (when printed on a white background), and a second symbology in which no black corner bits 21 are required. As such, two alternate methods for reading the barcode of FIG. 2 are described in the '189 Application, a first method which operates on the barcode which does not require corner bits, as described by the flowchart in FIG. 8A therein and the description related thereto, and a second method which operates on the barcode which is required to have corner bits, as described by the flowchart in FIG. 8B therein and the description related thereto. Although the two methods of reading the barcode described in the '189 Application provide satisfactory results, it was found that when the barcode was printed on a page with a complex background, the results provided by the locate step 70 of FIGS. 8A and 8B of the '189 Application, which is described therein in conjunction with FIGS. 9A and 9B, were less than optimal, particularly in the presence of single line noise conditions (i.e., an arbitrarily line across the barcode having a width less than or equal to the width of a bit block within the barcode, which can often occur in faxed documents and documents printed by poorly maintained printers). In addition, it was found that changes in the Hough Transform skew angle estimation step 71 of FIGS. 8A and 8B of the '189 Application could be made to increase processing speed. Also, because of the increased processing speed of the Hough Transform skew estimation step of the present invention, the template matching skew angle estimation step 71 of FIG. 8B of the '189 Application, which requires that the barcode include corner bits, decreasing the number of bits that could be stored within the barcode, and has a less than optimal processing speed, is no longer required.

It is therefore an object of the present invention to provide a method of decoding information digitally encoded in the form of a border-less clock free two-dimensional barcode printed on a printed medium which is able to operate in the presence of complex backgrounds.

It is an additional object of this invention to provide a method of decoding information digitally encoded in the form of a border-less clock free two-dimensional barcode printed on a printed medium which has an improved processing speed.

It is yet a further object of this invention to provide a method of decoding information digitally encoded in the form of a border-less clock free two-dimensional barcode printed on a printed medium which does not include corner bits.

It is another object of this invention to provide a method of decoding information digitally encoded in the form of a two-dimensional barcode printed on a printed medium which may or may not include a border.

Various other objects, advantages and features of the present invention will become readily apparent from the ensuing detailed description and the novel features will be particularly pointed out in the appended claims.

SUMMARY OF THE INVENTION

These and other objectives are realized by a method of decoding randomized information printed on a human readable medium in the form of a bitmap of rows and columns of data pixels representing encoded data bits. Each of the data pixels has either a first or second color. The bitmap has a predetermined size and is surrounded by an outer region of pixels of predetermined substantially uniform color. A border of contrasting color may be present within the outer region. The human readable medium is first scanned to digitize the bitmap and then formatted to a pixel based grayscale representation. The pixel based grayscale representation is converted to a pixel based binary representation by setting a threshold intensity level based on the grayscale representation and converting pixels greater than or equal to the threshold to a first level, e.g., "0", and pixels less than the threshold to a second level, e.g., "1". The row and column boundaries of the digitized bitmap are located by moving a window across the pixel based binary representation in stepwise fashion in a predetermined pattern. At each step the portion of the representation which is encompassed by the window is tested to determine whether the portion conforms to one or more characteristics of the bitmap, and the boundaries of the digitized bitmap are set as the boundaries of the window if the portion does conform to the one or more characteristics of the bitmap. The skew angle of the digitized bitmap is determined, and if necessary, the digitized bitmap is deskewed so that the skew angle is reduced to substantially zero. The digitized bitmap is thereafter cropped and the binary data is read out from the digitized bitmap, thereby producing a one-dimensional array of digital data. Finally, the one-dimensional array is derandomized and error-correction is applied to produce a substantially error-free digital representation of the encoded information.

In one embodiment, the window used in the locating step comprises a core region corresponding to the predetermined size of the bitmap and a quiet region corresponding to the outer region. The testing comprises separately testing portions of the representation encompassed by the core region and the quiet region to determine whether the portions conform to one or more characteristics of the bitmap and the outer region, respectively. Preferably, the pixel distribution of each region is tested to determine whether it falls within predetermined ranges to verify that the bitmap is present within the image, i.e., the bitmap within the core region will have an approximately even pixel distribution and the outer region will have a pixel distribution that has pixels of close to 100% of either "0" or "1". If the portions of the representation encompassed by the core region and the quiet region conform to the one or more characteristics of the bitmap, the boundaries of a candidate region for the digitized bitmap are set to the boundaries of the core region. In addition, if the portions of the representation encompassed by the window are found to satisfy the previous testing, the portion encompassed by the core region may also be cropped to determine the outer boundaries of the candidate bitmap therein, and the outer boundaries compared to the predetermined dimensions of the bitmap, to further verify that a bitmap is present within the window. Further, when the core region and quiet region testing indicates that the portion of the region confirms to one or more characteristics of the bitmap, but the cropping test indicates that no bitmap is present, the window is advanced to completely avoid the object identified in the cropping test, to improve the speed of operation by eliminating further testing of that object.

In another embodiment of the present invention, the skew angle is determined by first locating all of the horizontal or vertical edges within the located candidate region, preferably using a finite-state recognizer. The coordinates of a horizontal or vertical line within the located candidate region representing the horizontal or vertical edges are then calculated using the Hough Transform. Finally, the skew angle is calculated as the angle between the coordinates of the horizontal or vertical line within the candidate region and a horizontal line representing a row of pixels within the representation or a vertical line representing a column of pixels within the candidate region. Optionally both the horizontal and vertical edges can be located, and the skew angle can be calculated using both the horizontal and vertical edges.

In yet another embodiment, the candidate region is divided into a plurality of horizontal and/or vertical regions. Preliminary skew angles are calculated for each of the plurality of horizontal and/or vertical regions, and the skew angle is selected by a voting scheme from the preliminary skew angles, e.g., the median value is selected.

BRIEF DESCRIPTION OF THE DRAWINGS

The following detailed description, given by way of example and not intended to limit the present invention solely thereto, will best be understood in conjunction with the accompanying drawings in which:

FIG. 14A is a diagram of a prior art method of skew angle estimation based upon the use of only a single line within the edge image, and FIG. 14B is a diagram of the voting scheme method used as part of the skew angle estimation method of the present invention.

DETAILED DESCRIPTION OF THE PREFERRED EMBODIMENTS

As fully described in U.S. Pat. Nos. 5,625,721 and 5,703,972 to Lopresti et al. which are both entitled "Certifiable Optical Character Recognition" and in U.S. Pat. No. 5,748,807 entitled "A Method and Means For Enhancing Optical Character Recognition of Printed Documents", the contents of which are all explicitly incorporated by reference herein, information about the contents, layout, generation and retrieval of a document can be encoded by a computer when initially generating the document or upon subsequent computer processing thereof. The encoded document information can then be provided via a two-dimensional barcode, generated on the face of a printed version of the document. Advanced encoding and print resolution capabilities presently available can accommodate up to 30,000 bits of information in a single square inch of space. Therefore, as taught by the above-referenced applications, one can theoretically encode the entire document contents, limited only by the amount of space on the document face that one is willing to sacrifice to the two-dimensional barcode. A barcode scanner, in conjunction with or wholly separate from an optical page scanner, can scan the two-dimensional barcode and provide the information to an associated system equipped with the appropriate recognition and decoding software. The decoded information can then be used by the scanning system to create a new version of the document or to enhance the recognition, reproduction and error correction for the scanned document. To decode the two-dimensional barcode, it is not required that such barcode scanner and scanning system know the printing resolution of the two-dimensional barcode, provided that the scanning resolution of the scanner is able to establish at least a 3×3 pixel matrix for each logical bit of the two-dimensional barcode, for the preferred embodiment of the finite state recognizer discussed below with respect to FIG. 13.

The information encoded in the form of a two-dimensional barcode can be used to enhance the software tools already used to create paper documents. Examples include word processors, spreadsheets, object-oriented graphics, and multimedia applications, such as voice recording and photographic imaging.

Figure 1A:
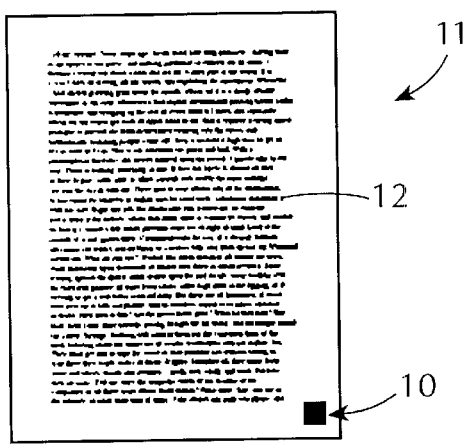
FIG. 1A is a diagram schematically illustrating the two-dimensional barcode of the '280 Application printed on a page of printed text.
Figure 1B:
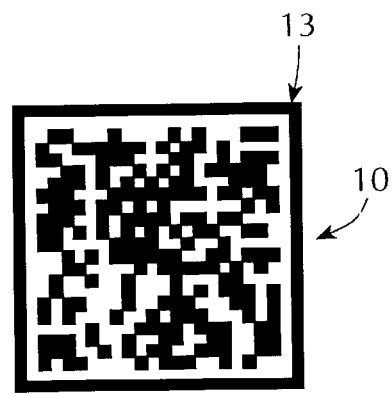
FIG. 1B shows an example of the two-dimensional barcode of the '280 Application.

The border 13 used in the two-dimensional barcode 10 of FIG. 1 was not a critical feature of the invention disclosed in the '280 Application, as most of the key procedures described therein work whether or not a border is present. However, the border 10 was used in the '280 Application by the skew estimation and deskewing steps.

Figure 2:
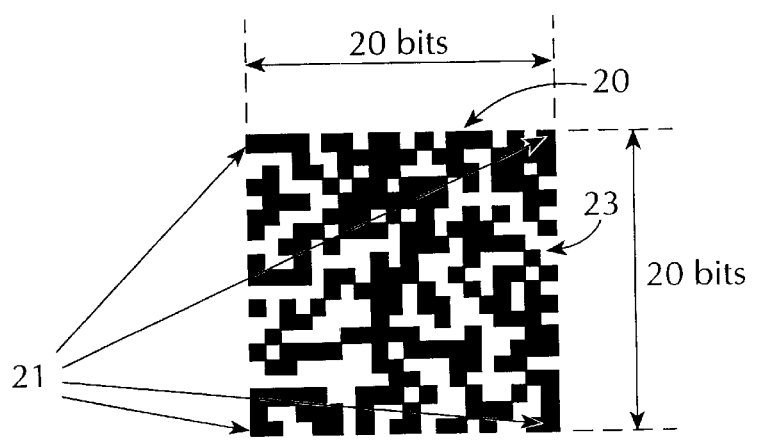
FIG. 2 shows an example of a two-dimensional barcode in accordance with the present invention.

FIG. 2 illustrates an example of the two-dimensional barcode symbology introduced in the '189 Application. Two-dimensional barcode 20 comprises an encoded set of data bits in a two-dimensional grid. Typically, each data bit which is encoded is printed as a matrix of black or white pixels 23. Preferably, a pixel matrix representing one data bit is square and may be as small as a 1×1 matrix to as large as a 6×6 matrix or more. Non-square matrices may also be used. There are no clocks or borders needed or required in the symbology for two-dimensional barcode 20. In the preferred embodiment, the two-dimensional barcode 20 is a 20×20 array of data bits, with each bit stored in a 9×9 pixel matrix, although it can be recognized that the size is flexible and that the only requirement on the size is that the reading process know the size of the encoded array.

Two different embodiments of the barcode symbology are described in the '189 Application. In the first embodiment, the four corner bits 21 are always black (when printed on a white background). The four corner bits 21 in the first embodiment are called "anchor" bits. The remaining data bits in the first embodiment of the '189 Application are pseudo-randomized and can hold any combination of desired information and error correction bits. The symbology of the first embodiment provides for good skew estimation when the skew is small and the two-dimensional barcode 20 is free from any damage. However, the placement of the anchor bits 21 in the corner makes them susceptible to damage. Thus, in the second embodiment described in the '189 Application, there is no requirement for anchor bits 21 and the two-dimensional barcode 20 is simply a N×M array of data bits, preferably with N=M=20, in which case providing for the storage of up to 50 bytes (400 bits) of information. In the second embodiment, all of the data bits are pseudo-randomized and can hold any combination of desired information and error correction bits. Preferably, a conventional (7,4) Hamming Code is used as the error correction code to detect and correct for random noise, in which case the two-dimensional barcode can hold up to 28 bytes (224 bits) of information.

Figure 3:
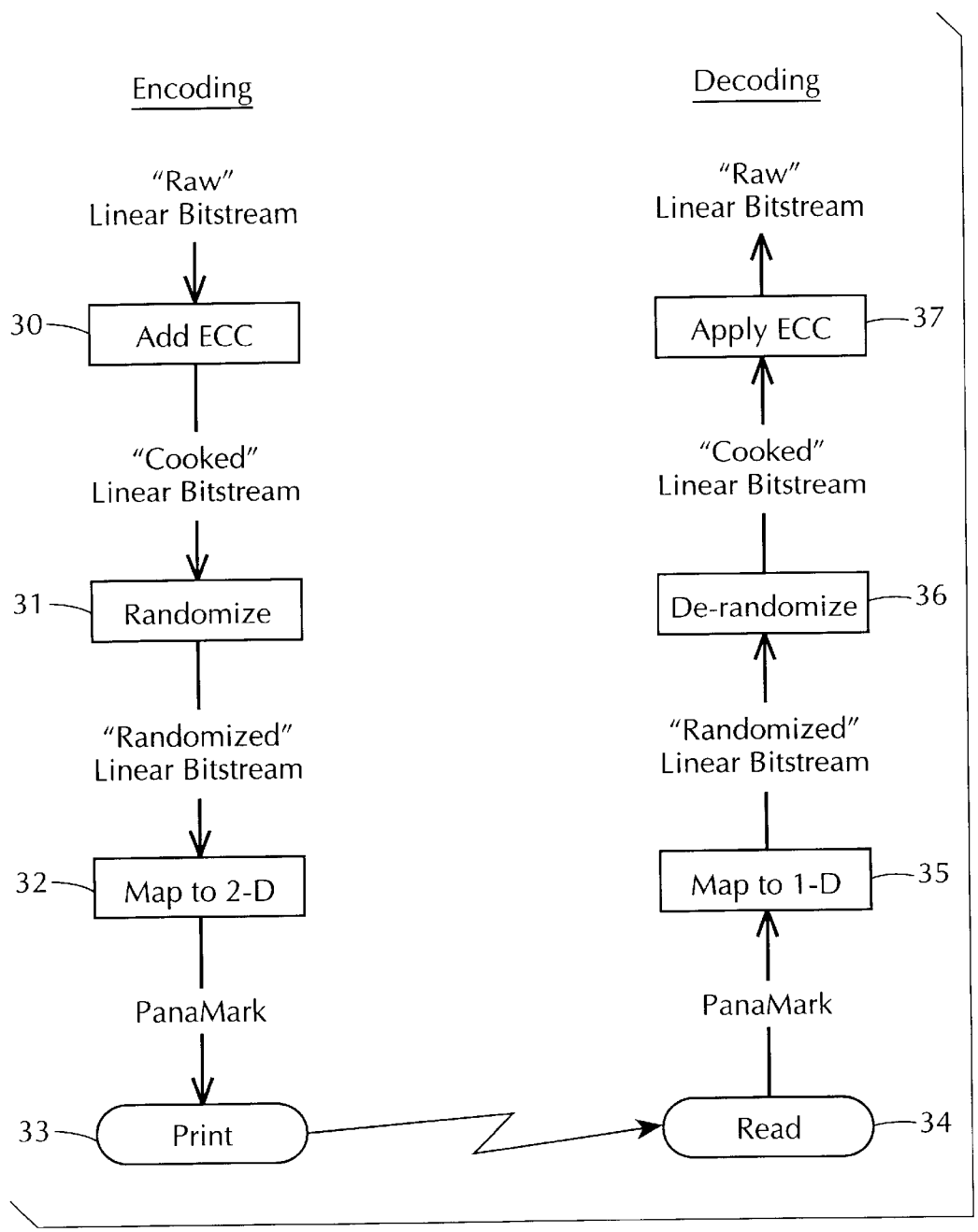
FIG. 3 is a flow chart showing the steps for encoding and decoding information onto a printed medium in accordance with the present invention.

FIG. 3 illustrates the steps involved in the encoding/decoding process. Except as discussed herein with respect to the methods of the present invention, each of the steps are more particularly described in the '280 Application and/or in the '189 Application. During the encoding process, input data in the form of a one-dimensional linear bitstream is first processed to add a standard, block-based error correction code ("ECC") at step 30, randomized at step 31, mapped from a one dimensional bitstream to a two-dimensional representation, i.e., the two-dimensional barcode, at step 32, and the two-dimensional barcode is finally printed at step 33. The decoding process repeats these steps in reverse order, the printed two-dimensional barcode is read at step 34, mapped from a two-dimensional to one-dimensional representation in step 35, derandomized at step 36, and finally the ECC is applied at step 37 to recreate the "raw" linear bitstream. In particular, the methods of the present invention are used in the read step 34.

Figure 4:
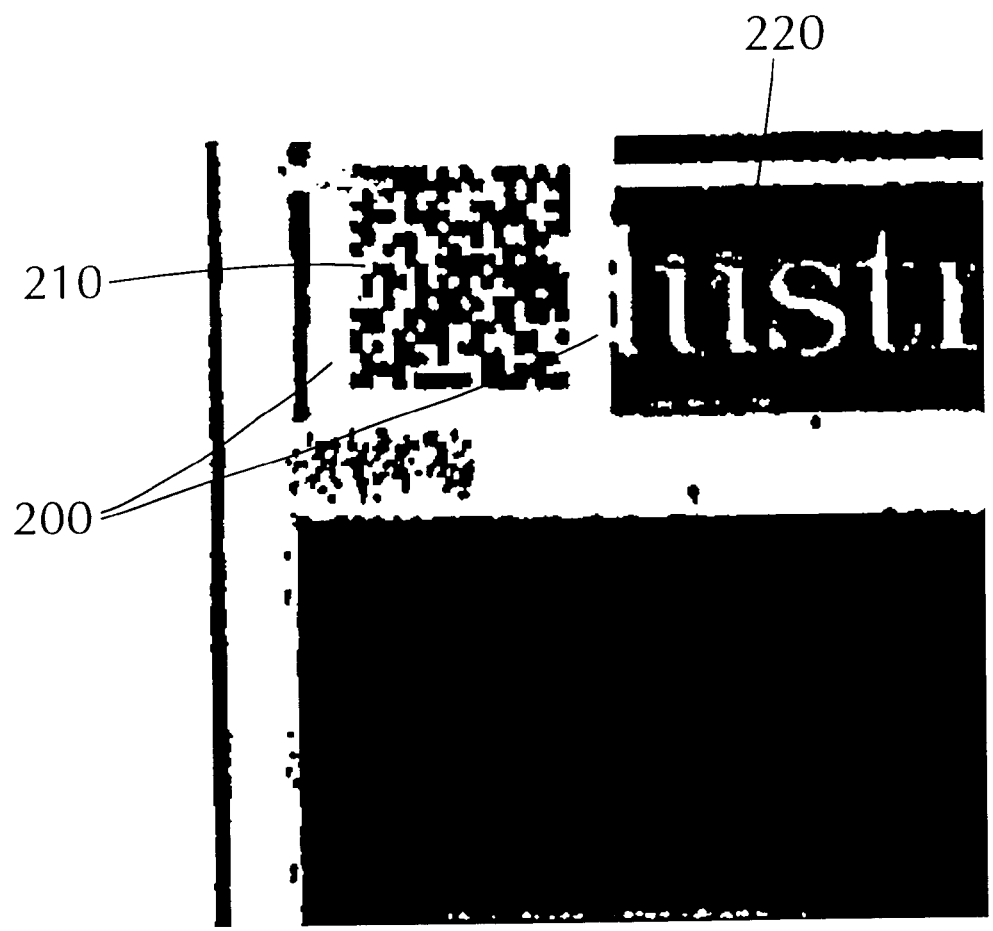
FIG. 4 shows a two-dimensional barcode printed on a printed medium having a complex background with a quiet zone provided around the barcode.
Figure 5:
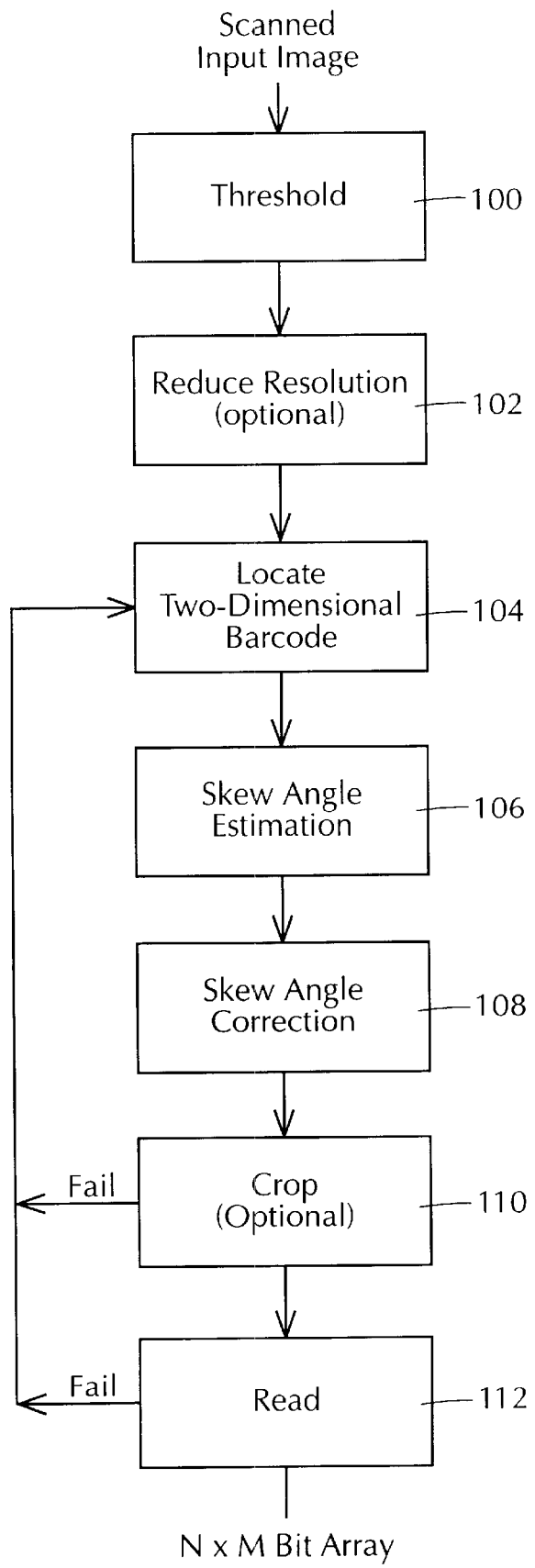
FIG. 5 is a flowchart describing how to read the two-dimensional barcode in accordance with the present invention.
Figure 6:
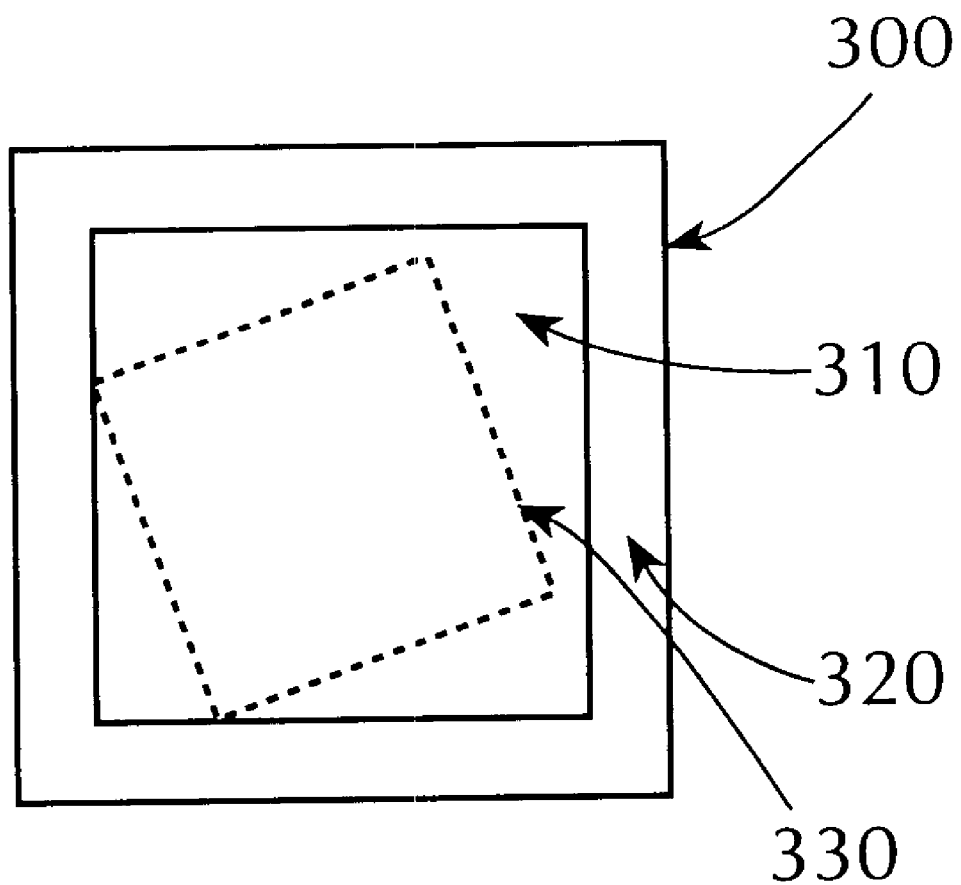
FIG. 6 shows the layout of the sliding window used as part of the locate method of the present invention.

FIG. 5 illustrates the steps in the reading procedure of the present invention. First, the scanned grayscale image is converted to black and white by thresholding step 100, wherein a certain intensity level is dynamically selected (e.g., the mean or median value pixel value) and pixels having a level equal to or above the selected intensity level will be considered to be black (or white) and pixels having an intensity level less than the selected intensity level will be considered to be white (or black). Next, to speed up the process, the resolution of the scanned input image is optionally reduced at step 102, as further discussed below. After that at step 104, a candidate two-dimensional barcode region is located and extracted from the input image by the sliding window method of the present invention, as further discussed below with respect to FIGS. 4, 6 and 7. If a candidate region is determined to include a two-dimensional barcode, the candidate region is extracted at step 104 from the original image (at the original resolution). Then, at step 106, the skew angle of the two-dimensional barcode within the candidate region is estimated by the method of the present invention, as is further described with respect to FIGS. 13 and 14 herein.

Once the skew angle is known, it is corrected as needed at step 108, as is described in further detail in the '189 Application. In particular, if the skew angle φ is greater than a minimum threshold α, above which the read step 112 is no longer able to reliably read the barcode, but below a second threshold β, a simple deskew method is employed. If the skew angle φ is greater than the second threshold β, typically set to seven degrees of skew, a trigonometric deskew process is employed which requires more processing time than the simple deskew method. The simple deskew method employs a shear rotation method and is fully disclosed in the '189 Application with respect to FIGS. 16A, 16B and 16C therein. The trigonometric deskew process is also fully described in the '189 Application with respect to FIG. 17 therein.

The candidate region is optionally cropped at step 110 to create a tight boundary around the two-dimensional barcode, as further described below. Finally, the information encoded in the two-dimensional barcode is read from the candidate region at step 112, as fully described in the '280 and '189 Applications. The candidate region may be tested at both crop step 110 and read step 112 to ensure that it contains certain characteristics of the two-dimensional barcode, and in the event that the candidate region does not include such characteristics, processing can revert to the locate step 104 to resume searching for a candidate region.

The first step 102 of the reading process reduces the resolution of the image by a factor of four, preferably, to speed up the locating step 104, although as one reasonably skilled in the art may realize, the resolution of the image may be reduced by other factors, and if processing speed is not an issue, this step need not be performed at all. Preferably, the input image is simply sub-sampled to create a lower resolution image. The following equation describes how a reduced resolution image is generated from the original input image in this manner:

$$R(I, J)=O(\text{row\_skip}*I, \text{col\_skip}*J) \tag{1}$$

for:

$$0 \leq I < \text{row\_m}/\text{row\_skip}$$

$$0 \leq J < \text{col\_m}/\text{col\_skip}$$

where O(x, y) represents the original input image, R(x, y) represents the reduced image, row_m and col_m represents the vertical and horizontal size of the input image array, respectively, and row_skip and column_skip are sampling factors in the vertical and horizontal directions, respectively. Preferably, row_skip and column_skip are both equal to 4. As one reasonably skilled in the art may realize, other methods of reducing the resolution of the input image may be substituted for the preferred method described by equation (1).

The locate step 104 determines the location of a two-dimensional barcode within a given document image. Prior art methods of locating include a simple locating scheme based on the distribution of a histogram of the horizontal and vertical projection of image pixels, as described in the '280 Application, and a mathematical morphology-based scheme, described in co-pending patent application "Method of Locating a Machine Readable Two Dimensional Barcode Within an Image (amended)", (Ser. No. 08/822,347, filed Mar. 17, 1997) ("the '347 Application"). The simple locating scheme of the '280 Application is relatively fast regardless of the location of the two-dimensional barcode within an image, but does not provide optimal results when the two-dimensional barcode is printed on a complex background, includes single line noise or has a skew angle of greater than five degrees. The morphology-based locating scheme of the '347 Application can handle document backgrounds such as the printed text, but does not handle complex backgrounds such as the dark background 220 of FIG. 4 and is not as efficient in terms of processing speed. The method described below of the present invention has the beneficial characteristics of both prior art methods, and is capable of locating the two-dimensional barcode when it is printed on a document including a complex background such as the dark background 220 of FIG. 4.

Referring now to FIG. 4, a quiet zone 200 of white space is now explicitly created around the two-dimensional barcode 210 when it is printed to improve the accuracy of the locate process when the two-dimensional barcode 210 is included within printed media which contains complex backgrounds, such as background 220. The quiet zone 200 also improves the accuracy of the locate process in the presence of line noise and skewing of the two dimensional barcode. As shown in FIG. 1A, when the two-dimensional barcode is positioned in a corner of a document outside the margins within which the document contents, such as text or graphics, lie, an area of white space is inherently present. However, a much more difficult situation presents itself when a document does not include such margins or other areas of white space. Thus, by explicitly requiring the presence of a quiet zone 200 around two-dimensional barcode 210, the two-dimensional barcode 210 may be placed anywhere on a document with a complex background, as is generally shown in FIG. 4, and still be read by the method of the present invention.

The locate step 120 of FIG. 5 takes advantage of the fact that the two-dimensional barcode is located in the center of a quiet zone (white region), which combination can be printed on any kind of document background. Thus, the two-dimensional barcode is surrounded by a white border region as shown in FIG. 4. As one reasonably skilled in the art will realize, the quiet zone requires that substantially all of the pixels therein be the same color, but the particular color may be black or white (or another color in the case of a color document, which will be converted to black or white in the threshold step 100). The locate step 120 must allow for a certain level of "speckle" noise and line noise which may be introduced in the quiet zone, for example during printing or scanning. The locate step 120 uses the sliding window 300 illustrated in FIG. 6 to locate a two-dimensional barcode within the input image. In particular, the sliding window 300 is moved across the input image and at chosen positions is used to extract the portion of the image within the confines of the sliding window 300. The extracted portion of the image is then tested to determine if a two-dimensional barcode candidate region exists therein, as further discussed below. The sliding window 300 has two regions: (1) a core region 310 and (2) a quiet region 320. The core region 310 corresponds to the two-dimensional barcode itself, and the quiet region 320 corresponds to the quiet zone of two-dimensional barcode. The size of the two regions is mainly determined by the specification of the two-dimensional barcode, i.e., the size of two-dimensional barcode 210 and quiet zone 200 shown in FIG. 4. However, since the size of the rectangular window necessary to contain the two-dimensional barcode increases when the two-dimensional barcode is skewed, as shown by skewed two-dimensional barcode 330 in FIG. 6, the size of the core region of the sliding window 300 is slightly larger than the expected size of the two-dimensional barcode in order to accommodate circumstances where a two-dimensional barcode is skewed up to a certain maximum amount. In addition, this feature also allows the two-dimensional barcode to be slightly magnified during the printing and/or scanning processes and still be located by the method of the present invention.

Various search patterns for the sliding window 300 can be used. For simplicity, the search pattern can start from the top-left corner of the image and scan, row by row, left to right for each row, as shown in FIG. 7A, which is easy to implement but does not use any a priori knowledge about the location of the two-dimensional barcode within a given image, and therefore may not be the most efficient search method.

In practice, the two-dimensional barcode is usually printed at a pre-defined location within a page. Thus, when decoding, only a small portion of the entire document image needs to be scanned by the sliding window 300. This small region is usually obtained by the scanning device according to the expected location of the two-dimensional barcode, e.g., in each corner of the document. Once the small region (or regions) is extracted, it is more likely that the two-dimensional barcode will be closer to the center of the extracted small region than to the boundary. The preferable search pattern starts from the center of the extracted small region and expands out in a spiral-like pattern, as shown in FIG. 7B, which allows the two-dimensional barcode candidate region to be located much quicker than the simple method discussed with respect to FIG. 7A. However, the implementation of this search method can be more complicated. Thus, a search pattern which is less complicated to implement than the search pattern of FIG. 7B, but faster than the search pattern of FIG. 7A, may be alternately implemented using a jump row search pattern, as illustrated in FIG. 7C, which searches by rows on the extracted small region. As shown in FIG. 7C, the jump row search pattern starts searching at the center row, then jumps one row up and one row down from the center row, then two rows up and two rows down from the center row, searching each row until a candidate two-dimensional barcode region is found or the top and bottom of the extracted small region is reached. For each row, the jump row search pattern searches from left to right. Although not be as efficient as spiral-like pattern of FIG. 7B, it is easier to implement.

Figure 7A:
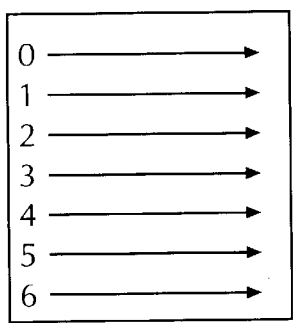
FIGS. 7A, 7B and 7C show three alternate embodiments of search patterns used as part of the locate method of the present invention.
Figure 7B:
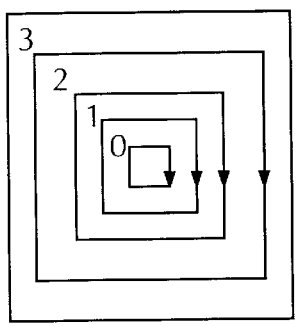
Figure 7C:
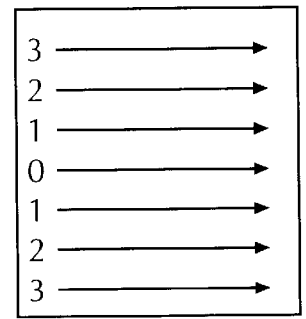

Further, if improved efficiency is necessary, each search pattern discussed herein can be modified to a search by skipping some scan paths, such as only searching along the even number paths shown in FIGS. 7A–7C.

When the sliding window passes each location, the image region within the sliding window 300 is checked to see if contains certain characteristics of a two-dimensional barcode. As indicated above, the bits in a two-dimensional barcode are randomized and contain a uniform distribution of bits. In addition, the approximate size of the two-dimensional barcode known, and the two dimensional barcode is surrounded by a quiet zone of white space. The locating method of the present invention checks the image region at each step to determine whether it contains these features, to determine whether the image region should be selected as a two-dimensional barcode candidate region.

As a first test at each position, the Core Region Density value of the image within the core region 310 of the sliding window 300 is tested to determine if it falls within a predetermined range. In particular, because the bits within the two-dimensional barcode are distributed in a uniform pattern because of the randomization process, a perfectly uniform two-dimensional barcode will have an equal number of black pixels and white pixels. The "Core Region Density" is defined as the ratio of the number of black pixels to the total number of pixels inside the core region 310 of scanning window 300. Because the binarization process of the scanning device or the threshold step 100 discussed above may cause the two-dimensional barcode region to be too dark or too light, the Core Region Density can vary slightly to a level somewhat lower or higher than 0.5. Therefore the Core Region Density value may be within a pre-determined range around 0.5. In addition, if the two-dimensional barcode to be decoded includes a border, the Core Region Density value threshold and range must be adjusted according to accommodate the extra black pixels present due to the black border (e.g., if the threshold is 0.5 and the range is 0.45 to 0.55 when no black border is present, the threshold may be 0.55 and the range is 0.50 to 0.60 when a black border is present). If the core region is found to have a Core Region Density which indicates the presence of a two-dimensional barcode, testing continues, otherwise the sliding window is moved to its next position to evaluate the Core Region Density.

As a second test at each position, Quiet Region Density of the region within the quiet region 320 of the sliding window 300 is evaluated to determine if it falls within a predetermined range. The Quiet Region Density is defined as the ratio of the number of black pixels to the total number of pixels inside the quiet region 320 of the sliding window 300. As shown in FIG. 4, the quiet zone 200 ideally contains no black pixels and thus a perfectly scanned two-dimensional barcode without any noise (i.e., black pixels) within the quiet zone 200 would yield a Quiet Region Density value of zero. To accommodate some speckle noise or single drawn line noise, a maximum density value somewhat greater than zero is pre-selected as an acceptable value. The Quiet Region Density value for the portion of the image within the quiet zone 320 of the sliding window 300 is evaluated, and if found to be less than or equal to the pre-selected value, testing continues, otherwise the sliding window is moved to its next position to evaluate the Core Region Density.

As a final test, when an image region within a scanning window falls within the acceptable ranges for both Core Region Density and Quiet Region Density, a cropping test is further performed to check the validity of each region. The cropping step of the present invention relies on the fact the bits in the two-dimensional barcode are uniformly distributed. Thus, in an array of 20×20 bits, no row or column will exist in the candidate region that does not contain any black bits. The cropping is done from the center to the outside. Starting from the center of the candidate region, each image row is scanned consecutively from the center to the top of the candidate region until a row is reached that contains no black pixels, which is assumed to be where the top edge of the two-dimensional barcode is. The scanning process is repeated three more times, with row scanning proceeding from the center downwards to the bottom of the candidate region, and then column scanning from the center to the left-most column of the candidate region, and finally from the center to the right-most column of the candidate region. Instead of a single row signifying the edge of the two-dimensional barcode, the respective boundaries of the two-dimensional barcode can be signified by the presence of a predetermined consecutive number of row or columns which contain no black to accommodate for scan line noise from the scanning process, or a too light image.

After the candidate region is cropped, the size of the new region is checked against the expected size of the two-dimensional barcode. If a significantly different size is found, it signifies that the candidate region is not a two-dimensional barcode region, and the sliding window is moved to its next position to evaluate the Core Region Density. Checking the size after the cropping process is effective in eliminating some regions which may be falsely detected by the first two tests. For instance, a text region may pass the density test, where it includes a font having a size similar to the size of each bit within the two-dimensional barcode and has certain line spacing and character spacing. However, cropping a text region will usually end up with a single connected component region, i.e. a character, which will have a size significantly different from that expected for the two-dimensional barcode.

Figure 8:
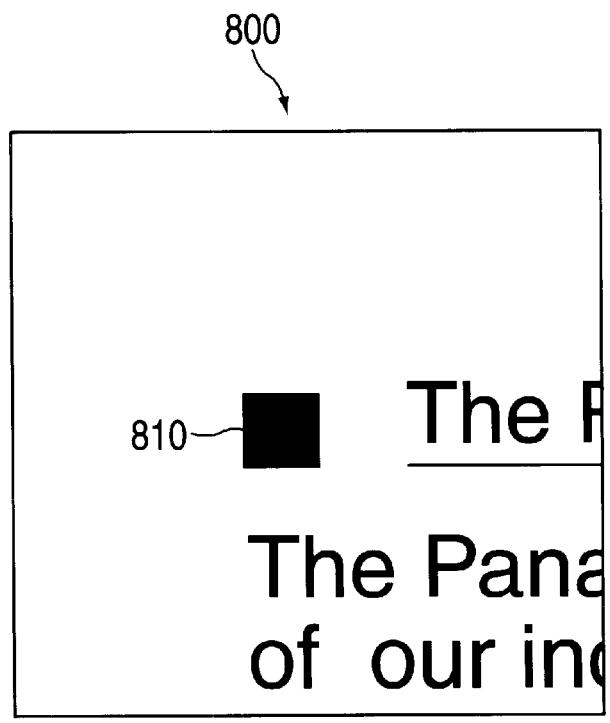
FIG. 8 shows an example of a document having a object which results in multiple cropping operations.
Figure 9:
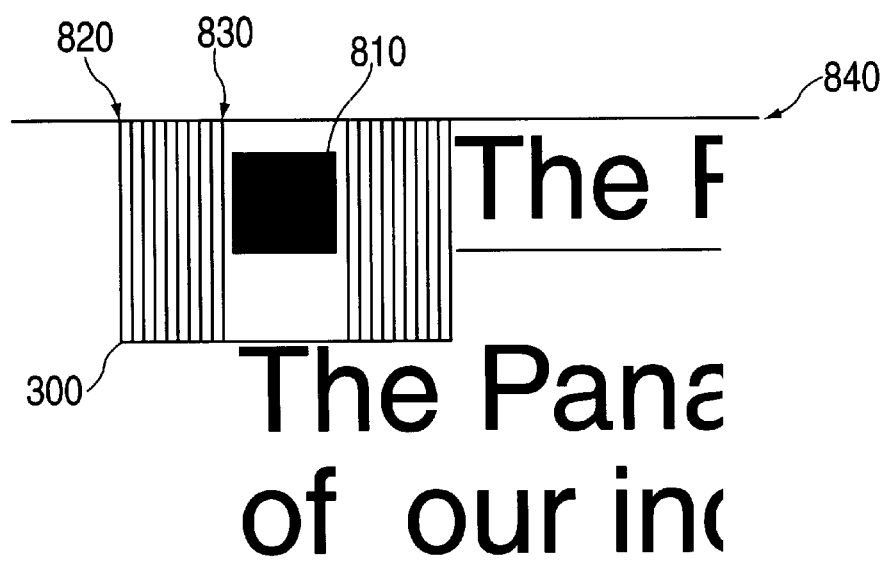
FIG. 9 is an illustration of the movement of a sliding window over the object depicted in FIG. 8.

Referring now to the simulated image 800 of FIG. 8, in some cases an object, e.g., object 810, may appear in an image which causes the current window to pass both of the density tests, but to fail the cropping test. As demonstrated by FIG. 9, since window 300 (FIG. 6) moves across a document in stepwise fashion, object 810 may cause the cropping test to be performed a number of times. As shown in the example of FIG. 9, while positioned at row 840, each core window 310 position from location 820 to location 830 will include object 810 therein and thus trigger the cropping test. Since the cropping test takes much longer to perform than the density testing (235 times longer in the preferred embodiment), objects like object 810 of FIG. 8 can cause a great increase in processing time due to the repeated iterations of the cropping test.

Figure 10:
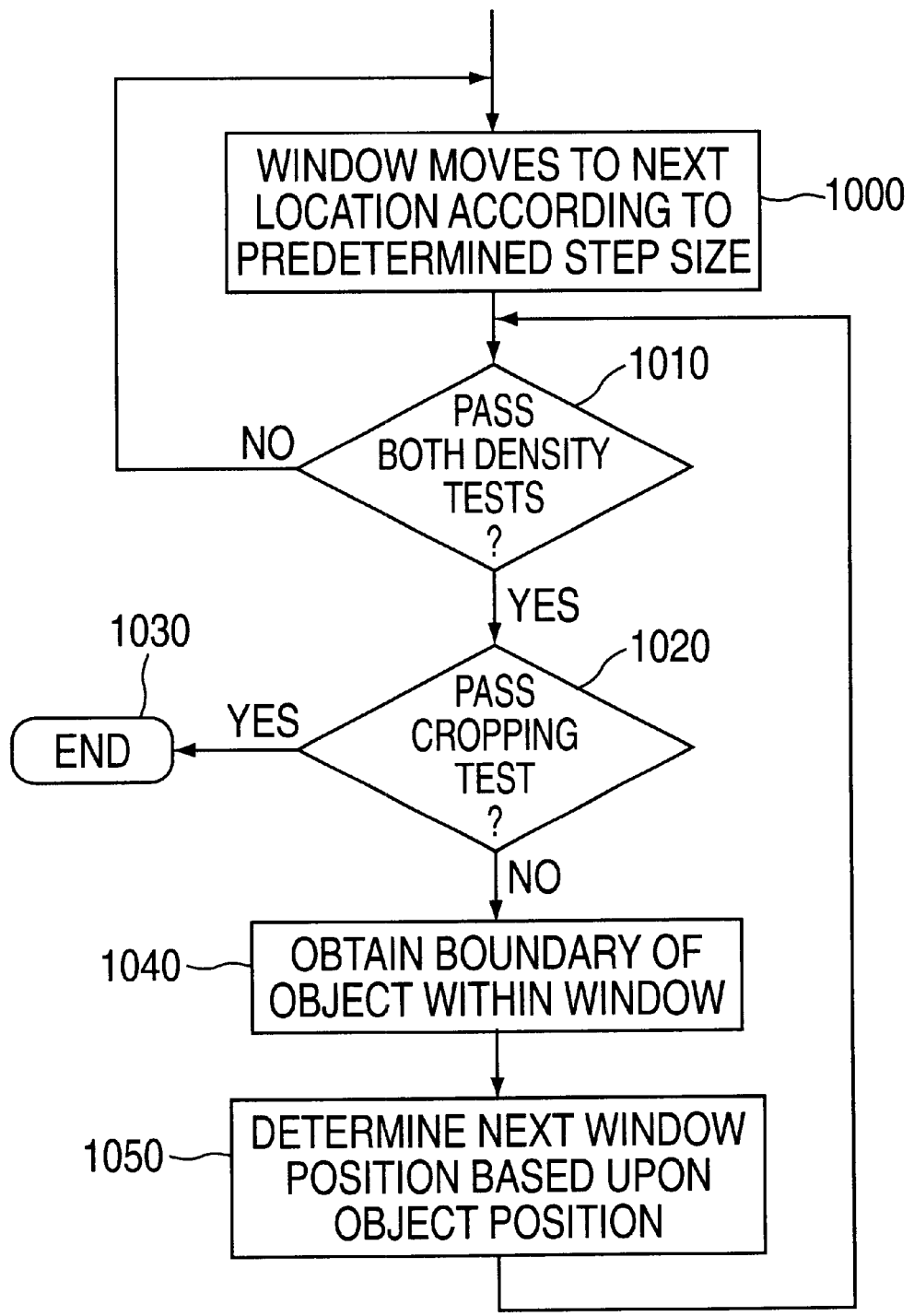
FIG. 10 is a flow chart showing the method used to reduce the number of cropping operations when operating on a document having an object similar to the one depicted in FIG. 8.

Referring now to the flowchart FIG. 10, to reduce the number of times that the cropping test is performed, once an object such as object 810 of FIG. 8 is identified, window 300 is moved beyond the boundary of such object, so that the cropping test need be performed only once. As demonstrated by the flowchart of FIG. 10, during normal operation, window 300 moves to a next location according to a predetermined step size (Step 1000) and the two density tests are performed (Step 1010). If the region within window 300 does not pass both of the density tests (core region and quiet region), then window 300 is simply moved (in stepwise fashion) to the next position (Step 1000). If the region within window 300 does pass both of the density tests (core region and quiet region), then the cropping test (Step 1020) is performed. If the region within window 300 passes the cropping test (Step 1030), then a valid two-dimensional barcode has been found. However, if the region within window 300 does not pass the cropping test, then the dimensions of any object within window 300 are determined (Step 1040), and window 300 is then moved beyond the boundaries of the identified object, so that the cropping test will not be called a multiple number of times for the same object. Two alternative methods are presented for determining where to move sliding window 300 after failing the cropping test, a first one-dimensional method and a second two-dimensional method.

Figure 11A:
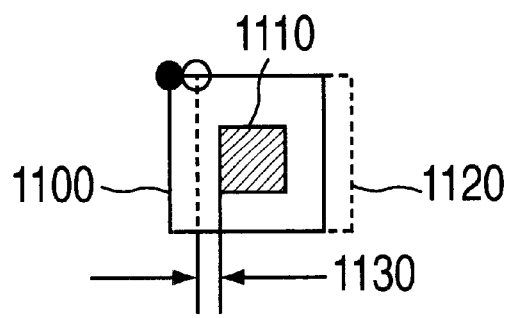
FIG. 11A is an illustration of a situation where the sliding window is not advanced beyond the normal step size when the cropping test is failed.
Figure 11B:
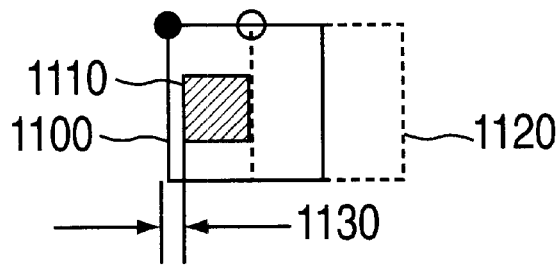
FIG. 11B is a first illustration of a situation where the sliding window is advanced beyond the normal step size when the cropping test is failed.
Figure 11C:
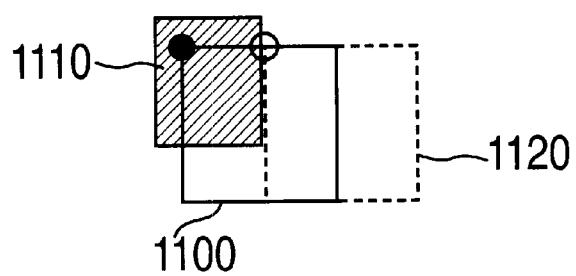
FIG. 11C is a second illustration of a situation where the sliding window is advanced beyond the normal step size when the cropping test is failed.

Referring now to FIGS. 11A–11C, to determine the next location of sliding window 300 in the one-dimensional method, which is the currently preferred method in which sliding window 300 moves from left to right within a row in a predetermined step size, the distance between the left edge of current window 1100 and the left edge of object 1110 is compared with the predefined quiet zone width 1130. If, as shown in FIG. 11A, the distance is greater than the quiet zone width 1130, then processing continues as usual, moving to the next position illustrated by window 1120. This ensures that object 1110 is properly evaluated as a potential two-dimensional barcode. On the other hand, if the distance is less than the predefined quiet zone width 1130 as shown in FIG. 11B or if the left edge of current window 1100 is within object 1110 as shown in FIG. 11C, then next window 1120 is advanced so that its left edge is slightly beyond the right edge of object 1110, thereby skipping any further processing on the current row involving object 1110, and thereby eliminated any additional processing time associated therewith.

Figure 12:
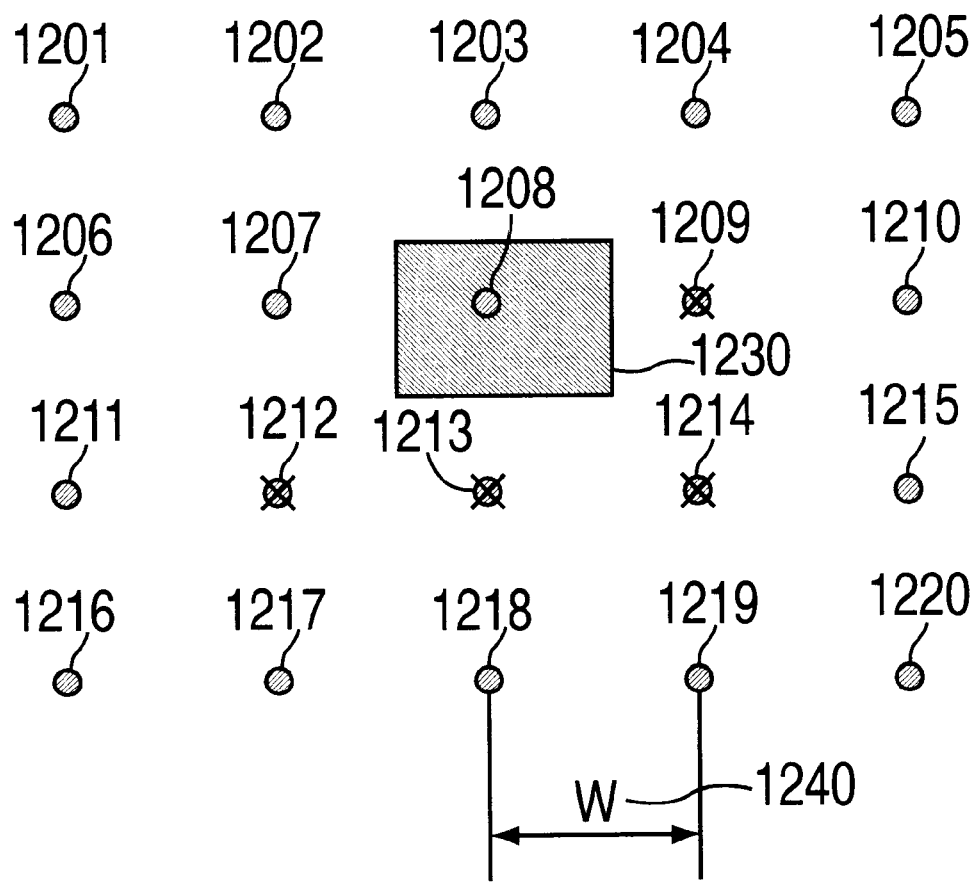
FIG. 12 is an illustration of the operation of the two-dimensional skip method.

The one-dimensional method presented above for determining the next location of sliding window 300 after failing the cropping test ensures that the cropping test will be called only once for each row in which an object such as object 810 of FIG. 8 is encountered. However, since window 300 moves in a two-dimensional pattern across a document, as shown in FIGS. 7A–7C, it is likely that such an object will span more than one row and therefore still require more than one call to the cropping test, resulting in less than optimum processing time. Therefore, in the two-dimensional method for determining the next location of sliding window 300, all four boundaries of the object (i.e., the cropped region) are identified and the region within the boundaries is marked as a hole. Thereafter, whenever the sliding window, during its movement across the document, overlaps a marked hole, the current region is considered to be not a two-dimensional barcode and both density tests and the cropping test are therefore skipped. Referring now to FIG. 12, positions 1201 to 1220 represent the location of the center of window 300 (FIG. 6) as it steps across the document using a simple search pattern (FIG. 7A), starting at position 1201 and moving sequentially in numerical order to position 1220. The core region 310 of window 300 (FIG. 6) has a predetermined size of 2W×2W and the step size is W. At position 1208, core window 310 (not shown) will overlap object 1230. As a result, both density tests are passed and the cropping test is performed. Since object 1230 is not a two-dimensional barcode, the cropping test fails. To ensure that object 1230 does not cause additional iterations of the cropping test, object 1230 is marked as a hole in memory, and thereafter any time that window 300 is in a position such that the marked hole overlaps the core window 310 (i.e., positions 1209, 1212, 1213 and 1214), the two density tests and the cropping tests are skipped. In this manner, additional iterations of the cropping test are eliminated for objects which span more than one row. As one of ordinary skill in the art will readily recognize, although this two-dimensional method is illustrated using the simple search pattern shown in FIG. 7A, it can be easily implemented in other search patterns, including, but not limited to, the spiral search pattern shown in FIG. 7B and the jump row search pattern in FIG. 7C.

Once a candidate region is found to meet all three tests, it will be considered a valid candidate region. The current location within the image of the sliding window is recorded and mapped to the full resolution image, and the corresponding region is extracted as a candidate region for further processing. If a two-dimensional barcode within the sliding window has a relatively large skew angle, the corners thereof may be left outside the boundaries of the core region 310 of the sliding window 300. The corners can be recovered by slightly expanding the size of the core region 310 when extracting the candidate region from the full resolution image, to ensure that the entire two-dimensional barcode is extracted. Any noise created in the extracted region because of the expansion of the window size can be removed at crop step 110, which uses the same inside out cropping procedure described above with respect to locate step 104.

Unlike the locate methods described in the '280 and '189 Applications, the method of the present invention does not crop the located candidate region before deskewing, because cropping a skewed two-dimensional barcode can easily damage its corners, whereas, cropping a correctly deskewed two-dimensional barcode will preserve its corners.

The skew estimation method of the '280 Application relies upon the location of two anchor bits in the top left and bottom left corners of the two-dimensional barcode to calculate the skew angle. As further discussed therein, templates are used to locate the corners, and this method fails when the skew angle is relatively large, greater than approximately five degrees of skew. In addition, the corners of the two-dimensional barcode are often deformed by noise, resulting in an inaccurate value for the estimated skew angle by the method of the '280 Application.

To solve these shortcomings, the '189 Application disclosed a Hough Transform-based skew estimation technique. The Hough Transform is a parametric transformation that can be used to detect geometric features, such as straight lines, within an image. The method of the '189 Application extracts all horizontal edge pixels by using a vertical black and white mask across the entire image. Then the Hough Transform is performed on all identified horizontal edge pixels to calculate the angle of the longest edge line, representing the skew angle of the two-dimensional barcode. This method requires a significant amount of processing time, because moving a vertical mask across the entire image to detect each edge pixel involves accessing each image pixel multiple times (the actual number of accesses depends upon the size of the mask) and because the Hough Transform method tests a wide variety of possible angles in 0.5 degree increments for all of the edge pixels to determine the angle of the longest edge line. In addition, because the angle determined by the Hough Transform corresponds to the angle of the line containing the most number of pixels, the skew angle will not be determined accurately when a drawn line noise is present across the two-dimensional barcode. This is because the line noise will be the dominant line among all of the edge lines, causing the skew estimation procedure to calculate the angle corresponding to the line noise. The effect of a drawn line is illustrated in FIG. 14, wherein line 400 is drawn along the bottom of two-dimensional barcode 410. Because the dominant line 430 in the horizontal edge image 420 is the dominant line, the skew angle estimation method of the '189 Application will incorrectly calculate the skew angle to be 0.5 degrees.

The skew estimation method of the present invention is also based on the Hough Transform method, with two significant changes to make the method more practical and reliable. First, a finite-state recognizer is used to detect the edge pixels of the two-dimensional barcode in a single pass, instead of the vertical mask used in the '189 Application. Since the black-white and white-black transitions within the candidate region are associated with edges in the logical rows and columns, a valid transition is determined by a specified number of consecutive black pixels followed by a specified number of consecutive white pixels (or vice versa) by an attributed finite state recognizer, which is shown in diagram form in FIG. 13. This method is more efficient because it accesses each image pixel only once and can be used for to detect either horizontal or vertical edges or both. In addition, the finite state recognizer does not require that the two-dimensional barcode include any anchor bits whatsoever, making the skew estimation method of the present invention more robust in the presence of a slight deformation of any corner of the scanned two-dimensional barcode.

In particular, the finite state recognizer sequentially examines each pixel in each row (or column) to find vertical (or horizontal) edges. An edge transistor is defined as a first sequence of at least N pixels in a first color followed by a second sequence of at least N pixels in the opposite color.

The position of the black pixel causing the edge transition is used as the location of the edge. Thus, for example, in a row consisting of four consecutive white pixels followed by four consecutive black pixels, and further followed by three consecutive white pixels, only the fifth pixel in the row will be designated as an edge transition when N=4. However, if N=3 in the same example, the fifth and the eighth pixels will be designated as edge transitions (edges).

Figure 13:
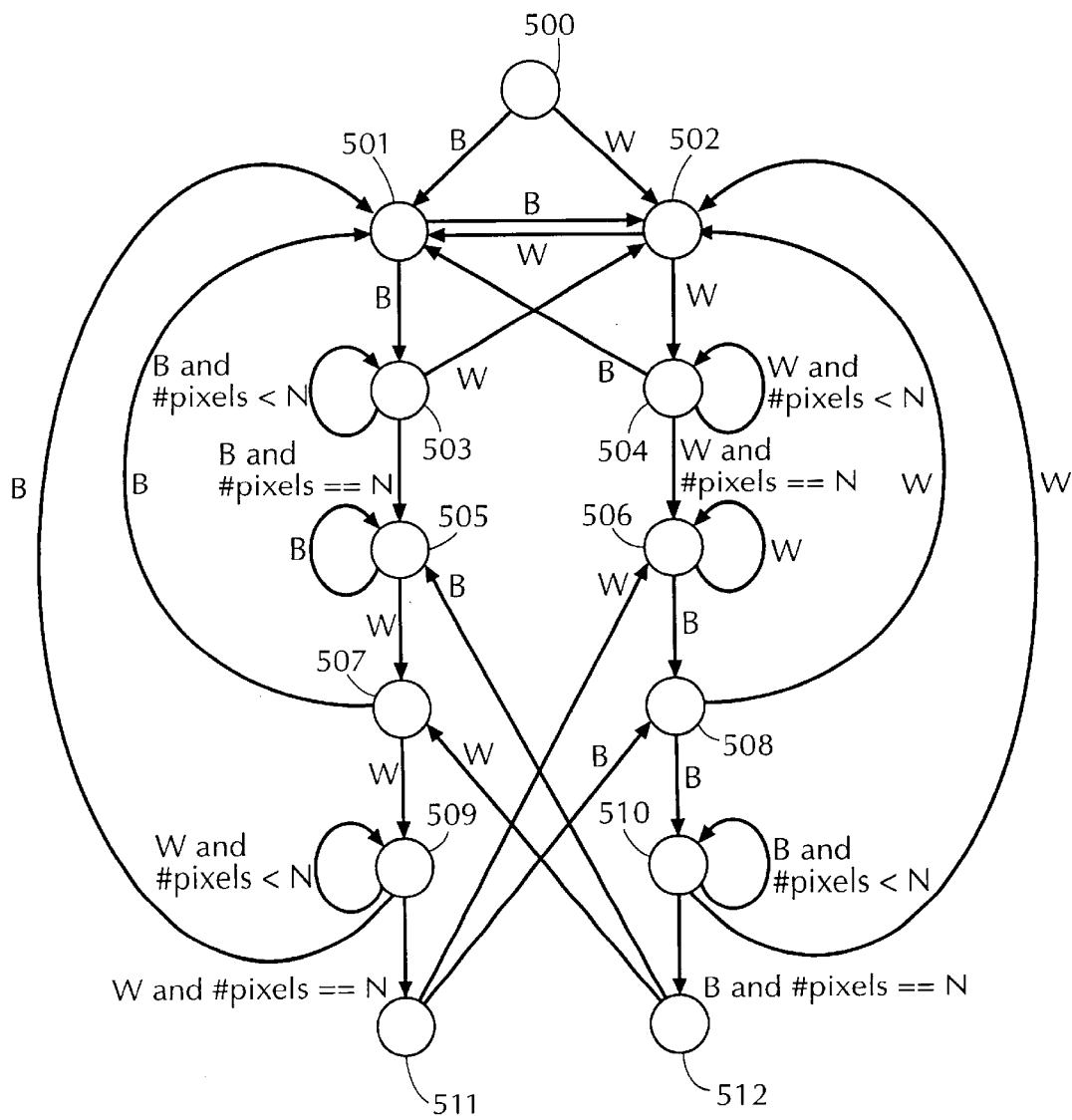
FIG. 13 is a diagram of the finite-state recognizer used to detect edge pixels in the skew estimation method of the present invention.

Referring now to the state diagram FIG. 13, a finite state recognizer, which is a conditional state machine, is shown which operates for N equal to or greater than 3. In FIG. 8, the designations "B" and "W" refer to the color (i.e., black or white) of the pixel at the particular position within the row or column being processed. Thus, at initial state 500, if the color of the first pixel is black, the process moves from state 500 to state 501. If the color of the first pixel is white, the process instead moves from state 500 to state 502. Processing continues along through the state machine, as discussed further below, until a special character is reached which indicates the end of the particular row or column being processed, at which point the next row or column is processed from initial state 500. At each state beyond state 500, a position index I is incremented to track the position of the pixel being examined within the particular row or column. In addition, certain other operations are performed at various states as indicated in Table 1 and further described below.

TABLE 1

| State | Operation(s) |
| --- | --- |
| 501, 502 | #pixels = 2 |
| 503–506, 509, 510 | #pixels = #pixels + 1 |
| 507 | #pixels = 2 |
|  | edge_candidate = I − 1 |
| 508 | #pixels = 2 |
|  | edge_candidate = I |
| 511, 512 | #pixels = #pixels + 1 |
|  | store (edge_candidate) |

At state 501, if the color of the next pixel is black, processing moves to state 503, whereas if the color of the next pixel is white, processing moves to state 502. Likewise, at state 502, if the color of the next pixel is white, processing moves to state 504, whereas if the color of the next pixel is black, processing moves to state 501. As indicated in Table 1, at states 501 and 502 the number of consecutive pixels encountered is set to 2 (for two consecutive black pixels at state 501 and two consecutive white pixels at state 502). From state 501, processing moves to state 503 if the next pixel is black and to state 502 if the next pixel is white. At state 503, processing continues at state 503 as long as each subsequent pixel encountered is black and the number of pixels remains less than N. Each time state 503 is passed, the pixel count, i.e., #pixels in Table 1, is incremented. When the Nth consecutive black pixel is reached, processing moves to state 505. If a white pixel is encountered before N consecutive black pixels, processing moves to state 502. Processing moves through states 502, 504 and 506 in an analogous manner when a series of white pixels is first encountered, with the pixel colors reversed.

At state 505, processing continues at state 505 for each subsequent black pixel, with the pixel count being incremented for each pass, in effect looking for the last black pixel in the current sequence. When a white pixel is encountered at state 505, processing moves to state 507, where the pixel count is set to 2 and the index of the last black pixel set as an "edge_candidate." The edge_candidate is the last black pixel in a sequence of N or more consecutive black pixels. At state 507, the pixel count is reset to 2. If the pixel encountered at step 507 is black, processing moves back to state 501 to begin counting black pixels, in effect discarding the edge_candidate because the necessary condition, i.e., at least N consecutive black pixels followed by at least N consecutive white pixels, has not been satisfied. If the pixel encountered at state 507 is white, processing moves to state 509, where the pixel count is incremented. Processing continues at state 509 so long as white pixels are encountered and the pixel count remains less than N. If a black pixel is encountered at any time before the Nth white pixel is reached, processing reverts to state 501, discarding the edge_candidate because the necessary condition of at least N consecutive white pixels has not been reached. If the Nth consecutive white pixel is reached, processing moves to state 511, where edge candidate is stored, and the pixel count is incremented. As stated above with respect to states 502, 506 and 506, the processing through states 508, 510 and 512 is analogous to that discussed above with respect to states 507, 509 and 511, with the pixel colors reversed. The only exception is that the edge_candidate at state 508 is set to the index of the current pixel, while the edge_candidate at state 507 is set to the index of the previous pixel, as indicated in Table 1, since only black pixels can be designated as edges.

If a black pixel is next encountered at state 511, processing moves to state 508 and that black pixel is set as an edge_candidate, since at least N consecutive white pixels have been encountered (only black pixels may be edges). After state 508, processing continues through states 510 and 512, in a similar manner to the processing which occurred at states 509 and 511, to determine if there are N consecutive black pixels following the sequence of at least N consecutive white pixels, and if so, the edge_candidate is stored as an edge at step 512. If a white pixel is encountered at state 511, processing moves to state 506 to look for the last white pixel in the current sequence, and then moves to state 508 once the last white pixel has been located to determine whether a sequence of at least N black pixels follows. Analogous steps occur with respect to the processing from state 512 through states 505, 507, 509 and 511.

The edge detection process continues through the row or column of pixels, looking for N consecutive black (or white) pixels and then N consecutive white (or black) pixels of a second color, until the special character is reached designating the end of the row or column. At each point where N consecutive black (or white) pixels is found that is followed by N consecutive white (or black) pixels, the black pixel at the boundary between the two sequences is set as an edge.

Once the edge pixels (either horizontal, vertical, or both horizontal and vertical) are detected by the finite state recognizer, they are mapped into the Hough domain using the same process described in the '189 Application.

The finite state recognizer improves the processing speed of the skew estimation step, but does not affect the impact of line noise. As shown in FIG. 14, when a line 400 is drawn which passes through a barcode 410, it will become the dominant edge line 430 within the edge image 420, and will produce an incorrect result for the skew angle when the line is not drawn parallel to the horizontal (or vertical when vertical edges are detected) axis of the barcode itself. The line 430 in FIG. 14 causes the skew angle to be incorrectly estimated as 0.5 degrees. To reduce the impact of such an arbitrary drawn line in estimating the skew angle of the two-dimensional barcode, the method of the present invention segments the horizontal edge image created by the finite state recognizer into a number of regions. The skew angle is determined for each region, and a voting scheme is used to determine the skew angle most likely representative of the actual skew. In the preferred method, the horizontal edge image is segmented into three regions, such as the top region 440, middle region 450, and bottom region 460 of the horizontal edge image 420 of FIG. 14B. The skew angle is determined for each region, i.e., five degrees for the top region 440 and the middle region 450 and 0.5 degrees for the bottom region (due to the edge line 430 caused by drawn line 400), and the median value, i.e., five degrees, preferably, is selected as the actual skew angle estimation. As one reasonably skilled in the art will recognize, there are many ways to implement the voting scheme. In the present invention, the median value is used because it provides the least overhead in terms of processing speed. Other methods of determining the skew angle include using the most frequently occurring skew angle (i.e., majority voting) or more complex weighting techniques (i.e., weighted vote). This multiple-region skew estimation scheme is more robust against arbitrary line noise than prior art methods because when line noise is present which will affect the skew estimation, it is likely to affect only a single region, as demonstrated by the line 400 in FIG. 14B. If line noise is present that crosses over more than one region, it must be at a relatively large angle with respect to the edge pixels in the horizontal edge image, and will thus not be a dominant line that affects the skew angle estimation. As one reasonably skilled in the art will recognize, based upon the detection of both horizontal and vertical edges, the edge image may be segmented into both horizontal and vertical regions for testing by one of the voting schemes.

As discussed above, the use of a finite state recognizer to locate the edge pixels followed by the Hough Transform-based skew estimation step allows the method of the present invention to eliminate the need for anchor bits in the two-dimensional barcode, which reduces the effect of corner deformation of the two-dimensional barcode. In addition, multiple-region voting scheme further increases the immunity of the skew estimation method of the present invention to background noise, especially drawn lines.

Once the skew angle is estimated, the candidate region is deskewed, as further discussed above with respect to step 108 of FIG. 5, and described in greater detail in the '189 Application, using a shear rotation method for smaller levels of skew and alternately using a trigonometric method for larger levels of skew.

After correcting the skew angle, the boundary of the two-dimensional barcode is optionally determined by crop step 110 of FIG. 5, which uses the same the inside out method described above with respect to the locate step 104, although a tighter threshold is used to check the validity of the two-dimensional barcode candidate region, since deskewing has already occurred and it is unlikely that any valid bits will be cut off. Once the candidate region is cropped, the dimensions thereof are compared to the expected dimensions of the two-dimensional barcode. If the dimensions differ greatly, a two-dimensional barcode is not present in the candidate region, and processing passes back to the locate step 104, as shown in FIG. 5. If the dimensions fall within a range which is close to the size of the two-dimensional barcode, processing passes to the read step 112.

At this point, the scanned two-dimensional barcode has been located, deskewed, and tightly cropped. The next step is to read out the data bits, which transforms the two-dimensional barcode from the image domain, where each bit is represented as a collection of black or white pixels, to a 20×20 bit array, in the preferred embodiment, of logical values. Note that since the two-dimensional barcode symbology is clock-free, there are no predetermined reference patterns to help orient the reading process. However, the logical size of the two-dimensional barcode is known in advance, for example, a square measuring 20 bits on each side in the preferred embodiment. Moreover, because the bits in the mark are pseudo-randomized during the encoding process, any particular row or column of pixels will show a higher distribution of black-white and white-black transitions near the edges in the logical rows and columns, and a lower distribution near the centers. This process is fully described in the '280 Application. Once horizontal and vertical center lines are established by the process described in the '280 Application, the bits are read out of the two-dimensional barcode by recording the pixel value lying at the intersection of each horizontal and vertical center line (for example, setting each "white" pixel value="0" and each "black" pixel value="1"). The '189 Application describes, with respect to FIGS. 18A–18D, an improved clocking method for reading out the bits from the two-dimensional barcode which reduces the error rate by reading the bits in each of four possible directions, thereby creating four different arrays representing the data, and choosing the array for output which the ECC step 37 of FIG. 3 shows to have the least number of errors. Here again, if the read step fails, as determined by the ECC for example, processing can pass back to the locate step 104, as shown in FIG. 5.

While the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A method of locating a two-dimensional barcode within a scanned binary image comprising:

(A) moving a window across said image in stepwise fashion in a predetermined pattern;

(B) testing at each step a portion of said image which is encompassed by said window to determine whether said portion of said image conforms to one or more characteristics of said two-dimensional barcode;

(C) cropping said portion of said image which is encompassed by said window and comparing dimensions of said cropped portion to predetermined dimensions when said portion of said image does conform to said one or more characteristics of said two-dimensional barcode;

(D) moving said window to avoid said cropped portion when said dimensions of said cropped portion do not conform to said predetermined dimensions; and (E) setting boundaries of said two-dimensional barcode within said scanned binary image as the boundaries of said window when said portion of said image does conform to said one or more characteristics of said two-dimensional barcode and when said dimensions of said cropped portion conform to said predetermined dimensions.

2. The method of claim 1, wherein said moving step comprises the steps of:

(1) identifying the location of an object within said window;

(2) comparing the distance between a left edge of said window and a left edge of said object;

(3) moving said window to a next normal position when the distance between a left edge of said window and a left edge of said object is greater than a predetermined dimension; and (4) moving said window such that said left edge is beyond a right edge of said object when the distance between the left edge of said window and the left edge of said object is less than or equal to a predetermined dimension.

3. A method of locating a two-dimensional barcode within a scanned binary image comprising the steps of:

(A) moving a window across said image in stepwise fashion in a predetermined pattern;

(B) testing at each step a portion of said image which is encompassed by said window to determine whether said portion of said image conforms to one or more characteristics of said two-dimensional barcode;

(C) cropping, prior to setting the boundaries of said two-dimensional barcode within said scanned binary image, said portion of said image which is encompassed by said window and comparing dimensions of said cropped portion to predetermined dimensions when said portion of said image does conform to said one or more characteristics of said two-dimensional barcode;

(D) setting boundaries of said digitized bitmap two-dimensional barcode as the boundaries of said window when said dimensions of said cropped portion conform to said predetermined dimensions;

(E) identifying and storing in memory the location of an object within said window when said dimensions of said cropped portion do not conform to said predetermined dimensions;

(F) prior to performing said testing step at each subsequent window position, determining whether said object falls within the boundaries of said window; and (G) skipping said testing step and said cropping step whenever said object falls within the boundaries of said window.

* * * * *